(No Model.)
F. R. H. THOMAS.
INTERNAL BOTTLE STOPPER.
No. 537,946. Patented Apr. 23, 1895.
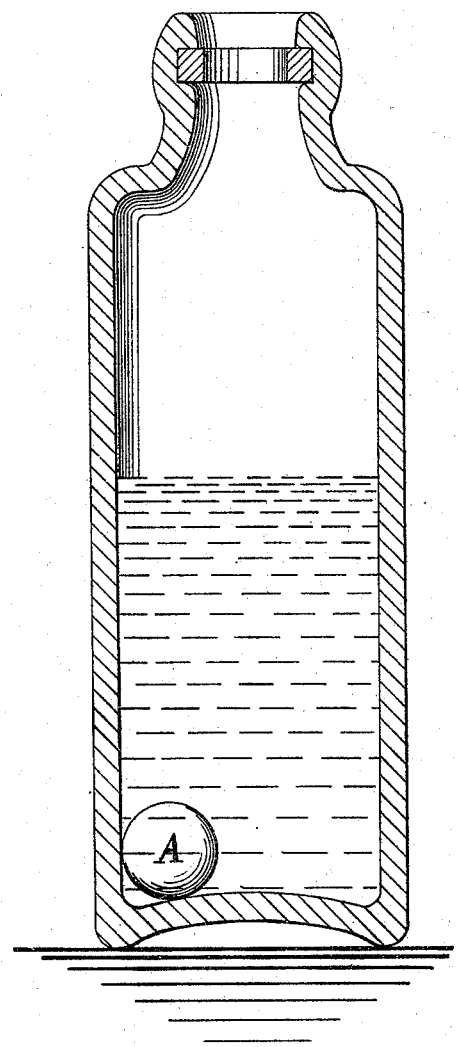

UNITED STATES PATENT OFFICE.

FREDERIC R. H. THOMAS, OF CATSKILL, NEW YORK, ASSIGNOR TO IMOGEN N. THOMAS, OF SAME PLACE.

INTERNAL BOTTLE-STOPPER.

SPECIFICATION forming part of Letters Patent No. 537,946, dated April 23, 1895.

Application filed September 8, 1894. Serial No. 522,503. (No model.)

*To all whom it may concern:*

Be it known that I, FREDERIC R. H. THOMAS, a citizen of the United States, and a resident of Catskill, in the county of Greene and State of New York, have invented certain new and useful Improvements in Internal Bottle-Stoppers, of which the following is a specification.

My invention relates to internal ball-valve-stoppers for bottles containing so called soda-water, or other beverage or liquid charged with carbonic acid, or other gas, under pressure. The stoppers heretofore used for that purpose are generally balls made of stone or glass, both kinds of which are liable to the serious objection, that, in handling and shaking the bottles, as when washing them, and, particularly when inverting and again reversing them, when empty, the momentum due to the weight and movement of the ball together with the hardness of its surface, frequently cause bottles to break. Rubber balls, although they may be weighted to sink and yet not be liable to break the bottles, under circumstances as aforesaid, are objectionable, because they impart to the beverage a disagreeable taste and are blackened, corroded and deteriorated by the chemical action of acidulous liquids, for instance citric acid.

The object of my present improvement is to provide an internal bottle-stopper not liable to corrosion or deterioration, of requisite elasticity and of weight sufficient to sink in the liquid, but not to break the bottle, no matter how much the latter be shaken.

The accompanying drawing represents a vertical section of a suitable internal-stopper-bottle, uncorked and partly emptied, and, resting on the bottom of the same, is shown a ball-valve-stopper A, such as is the subject of the present improvement.

The ball or stopper A is made of the following named ingredients compounded in the following described manner: whiting, about eleven parts (by weight); white lead, about five parts (by weight); shellac, about five parts (by weight); white rosin, about two parts (by weight); flock, about one and one-half parts (by weight). By "flock" is meant a finely pulverized fibrous substance, such as wool, cloth, or asbestos. These are first mixed dry, as thoroughly as possible by hand, then fed in, repeatedly, between steam-heated rollers, until very thoroughly mixed, the steam-heat melting some of the ingredients sufficiently to make them all adhere together as a dough. This is then allowed to run out in a continuous sheet upon an endless apron. Out of the thus produced sheet of dough squares or blocks are cut of suitable size each to suffice for making a ball of the desired size of the stopper. Each block is then softened, by heat, by placing it upon a steam-heated table and lastly compressed to the required shape in a suitable mold. Repeated tests have proved that a stopper thus made will not deteriorate in the use above stated, for which it is intended. It withstands even a mixture of one part of oil of vitriol (sulphuric acid) with two parts of water; has the proper elasticity and weight, and will not break the bottle, no matter how much the latter, with the stopper free to roll and fall inside, may be shaken.

I claim—

An interior bottle-stopper of whiting, white lead, shellac, rosin and flock, as and for the purpose set forth.

Signed at Catskill, in the county of Greene and State of New York, this 29th day of August, A. D. 1894.

FREDERIC R. H. THOMAS.

Witnesses:
   A. W. ALMQVIST,
   CHAS. G. COFFIN.